United States Patent [19]
Hallowell et al.

[11] Patent Number: 5,560,144
[45] Date of Patent: Oct. 1, 1996

[54] NO-TIE SYSTEM FOR COUPLING FISHING LINES

[76] Inventors: Gary Hallowell, 53 Maple St.; Eric Hallowell, 81 Homestead Ave., both of Greenfield, Mass. 01301; Scott Hallowell, #6 Forrest Ridge Ct., Arden, N.C. 28704

[21] Appl. No.: 495,295

[22] Filed: Jun. 27, 1995

Related U.S. Application Data

[63] Continuation-in-part of Ser. No. 199,789, Feb. 22, 1994.

[51] Int. Cl.⁶ .................................................. A01K 91/03
[52] U.S. Cl. ............................................................ 43/44.93
[58] Field of Search ........................... 43/44.93, 44.91, 43/44.9, 44.95, 44.87, 42.74; 24/136 R, 136 K, 136 L, 136 B, 115 M; 403/165

[56] References Cited

U.S. PATENT DOCUMENTS

| | | | |
|---|---|---|---|
| 2,379,676 | 7/1945 | Blackstone | 43/44.93 |
| 4,251,941 | 2/1981 | Howard | 43/44.91 |
| 4,628,630 | 12/1986 | Bohme | 43/44.93 |
| 4,724,584 | 2/1988 | Kasai | 24/136 R |
| 5,327,672 | 7/1994 | Johnson | 43/44.91 |

*Primary Examiner*—Jeanne M. Elpel

[57] ABSTRACT

A new and improved system for coupling a flexible line having a free end with another member without the threading and tying of line comprising a body having a cylindrical central section and end sections. The body has an elongated primary hole extending axially along the length thereof and a secondary hole extending radially through the center thereof. The secondary hole has on the first side thereof a cylindrical recess with a diameter greater than the diameter of the secondary hole to form an abutment shoulder. The secondary hole has on the second side thereof opposite from the first side an enlarged recess with a flat bottom and at least one indentation extending inwardly axially with respect to the secondary hole and radially with respect to the primary hole. The region of the secondary hole between the abutment surface and the bottom constitutes a bearing surface.

5 Claims, 7 Drawing Sheets

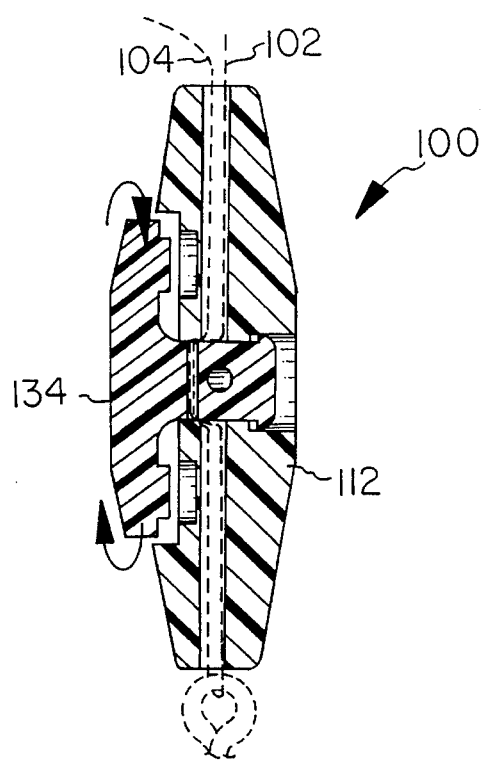
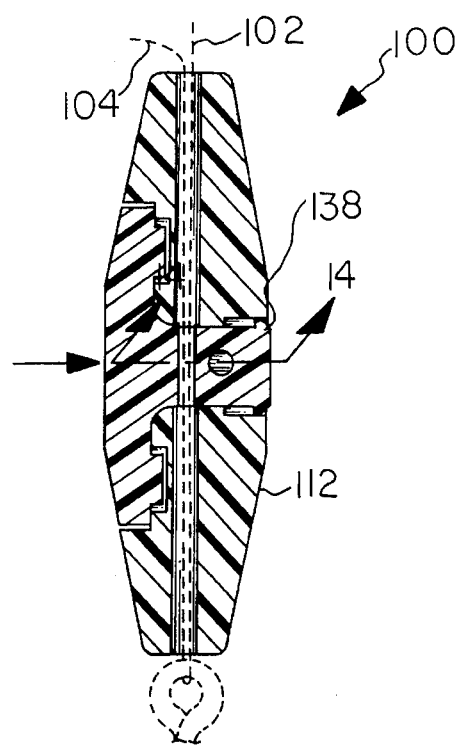
FIG. 12   FIG. 13
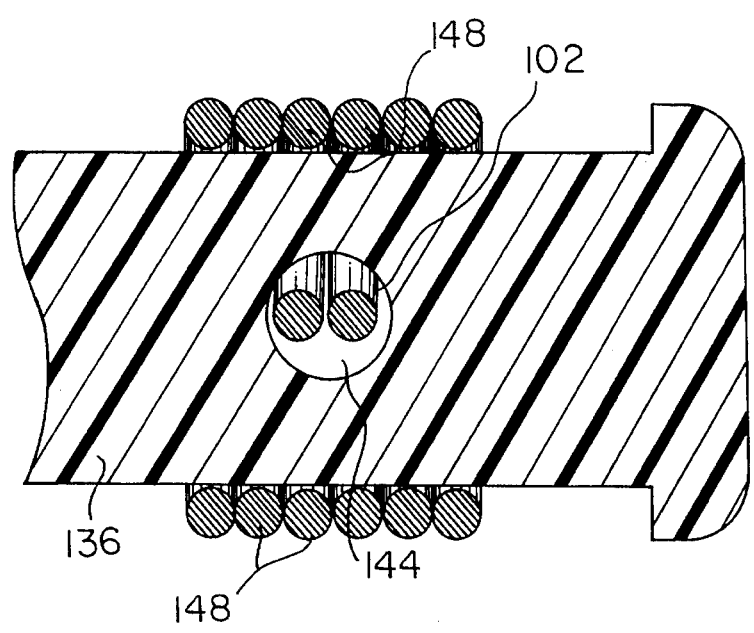
FIG. 14

NO-TIE SYSTEM FOR COUPLING FISHING LINES

CROSS-REFERENCE TO RELATED APPLICATIONS

This application is a continuation-in-part of application Ser. No. 08/199,789, filed Feb. 22, 1995, now pending.

BACKGROUND OF THE INVENTION

1. Field of the Invention

The present invention relates to a no-tie system for coupling fishing lines and more particularly pertains to coupling mechanisms which may be used to join ends of fishing lines without tying a knot.

2. Description of the Prior Art

The use of a no-tie system for coupling fishing lines is known in the prior art. More specifically, line coupling devices heretofore devised and utilized for the purpose of joining ends of lines are known to consist basically of familiar, expected and obvious structural, notwithstanding the myriad of designs encompassed by the crowded prior art which has been developed for the fulfillment of countless objectives and requirements.

Various approaches have been set forth in the prior art for improving fishing lines and the coupling thereof. By way of example, U.S. Pat. No. 4,141,116 to Zalonis; U.S. Pat. No. 4,177,598 to Jolley; U.S. Pat. No. 5,150,539 to Sorola and U.S. Pat. No. 4,600,331 to Gray all disclose complex devices for coupling a fishing line to an associated component but each relies upon a pair of preformed loops. In addition, U.S. Pat. No. 4,633,609 does not require a loop but, rather, relies upon the wedging action of two mating components in combination with the threading of the free end of a line through a small aperture at the end of the wedging components.

In this respect, the no-tie system for coupling fishing lines according to the present invention substantially departs from the conventional concepts and designs of the prior art, and in so doing provides an apparatus primary developed for the purpose of joining the ends of fishing lines without the use of knots.

Therefore, it can be appreciated that there exists a continuing need for a new and improved no-tie system for coupling fishing lines which can be employed without knots reliably, efficiently, conveniently and economically. In this regard, the present invention substantially fulfills this need.

SUMMARY OF THE INVENTION

In view of the foregoing disadvantages inherent in the known types of no-tie systems for coupling fishing lines now present in the prior art, the present invention provides a new and improved no-tie system for coupling fishing lines construction wherein the same can be utilized for coupling lines without knots. As such, the general purpose of the present invention, which will be described subsequently in greater detail, is to provide new and improved no-tie system apparatus method which has all the advantages of the prior art and none of the disadvantages.

To attain this, the present invention essentially comprises a new and improved system for coupling a flexible line having a free end with another member without the threading and tying of line comprising, in combination, a body having a cylindrical central section and generally cone shaped end sections. The body has an elongated primary hole extending axially along the length thereof and a secondary hole extending radially through the center thereof. The secondary hole has on the first side thereof a cylindrical recess with a diameter greater than the diameter of the secondary hole to form an abutment shoulder. The secondary hole has on the second side thereof opposite from the first side a rectangular recess with a flat bottom and spaced indentations on opposite sides of the secondary hole extending inwardly axially with respect to the secondary hole and radially with respect to the primary hole. The region of the secondary hole between the abutment surface and the bottom constitutes a bearing surface. A shaft has a central cylindrical section with an enlarged cylindrical head. The cylindrical section has a diameter slightly less than the diameter of the bearing surface and an axial length slightly greater than the axial length of the bearing surface. The head has a diameter slightly less than the diameter of the cylindrical recess and an axial length slightly less than the axial length of the cylindrical recess. The shaft also has shoulders on the side thereof remote from the head adapted to fit within the rectangular recess. The shoulders have a plurality of projections positionable within the indentations when in a lock position. The cylindrical section of the shaft also has a radial tertiary hole adapted to axially align with the primary hole of the body when in the lock position whereby the free end of a flexible line may be fed through a first portion of the primary hole and through the tertiary hole of the post and through a second portion of the primary hole when the body and post are in the lock position and then coupled to an object to be secured and then the free end of the flexible line may be fed through the second portion and tertiary hole and first portion, and whereafter the cylindrical section of the post may be axially moved to an unlock position and rotated on the bearing surface to form a coil in the line around the cylindrical section of the post adjacent to the shoulders, and whereafter the post may be axially inserted into the primary hole fully to the lock position whereby the projections extend into the indentations to effect the coupling of the post to the body and the securement of the line into a fixed orientation with respect to the system.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved no-tie system for coupling fishing lines which has all the disadvantages of the prior art couplers and none of the disadvantages.

It is another object of the present invention to provide a new and improved no-tie system for coupling fishing lines which may be easily and efficiently manufactured and marketed.

It is a further object of the present invention to provide a new and improved no-tie system for coupling fishing lines which is of a durable and reliable construction.

An even further object of the present invention is to provide a new and improved no-tie system for coupling fishing lines which is susceptible of a low cost of manufacture with regard to both materials and labor, and which accordingly is then susceptible of low prices of sale to the consuming public, thereby making such no-tie system for coupling fishing lines economically available to the buying public.

Still yet another object of the present invention is to provide a new and improved no-tie system for coupling fishing lines which provides in the apparatuses and methods of the prior art some of the advantages thereof, while simultaneously overcoming some of the disadvantages normally associated therewith.

Still another object of the present invention is to couple the ends of lines without the use of knots.

Yet another object of the present invention is to increase the enjoyment of fisher persons and abate the undesirable task of coupling the ends of lines.

Even still another object of the present invention is to provide a new and improved system for coupling a flexible line having a free end with another member without the threading and tying of line comprising a body having a cylindrical central section and end sections. The body has an elongated primary hole extending axially along the length thereof and a secondary hole extending radially through the center thereof. The secondary hole has on the first side thereof a cylindrical recess with a diameter greater than the diameter of the secondary hole to form an abutment shoulder. The secondary hole has on the second side thereof opposite from the first side an enlarged recess with a flat bottom and at least one indentation extending inwardly axially with respect to the secondary hole and radially with respect to the primary hole. The region of the secondary hole between the abutment surface and the bottom constitutes a bearing surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 11, 12 and 13 illustrate the utilization of the device of the prior Figures.

FIG. 14 is a cross sectional view taken along line 14—14 of FIG. 13.

Similar reference characters refer to similar parts throughout the several views of the drawings.

DESCRIPTION OF THE PREFERRED EMBODIMENT

Figure 1:
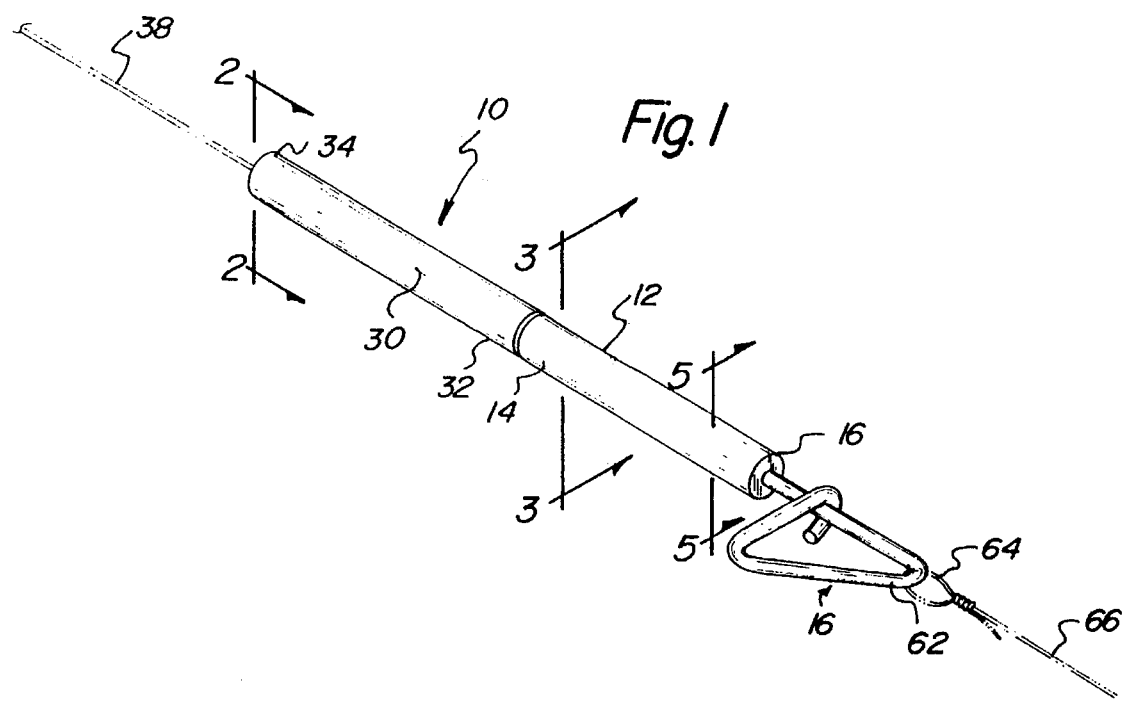
FIG. 1 is a perspective illustration of the preferred embodiment of the no-tie system for coupling fishing lines constructed in accordance with the principles of the present invention.
Figure 2:
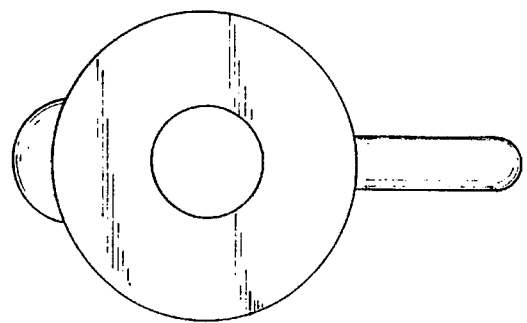
FIG. 2 is an end view of the apparatus shown in FIG. 1 taken along line 2—2 of FIG. 1.
Figure 3:
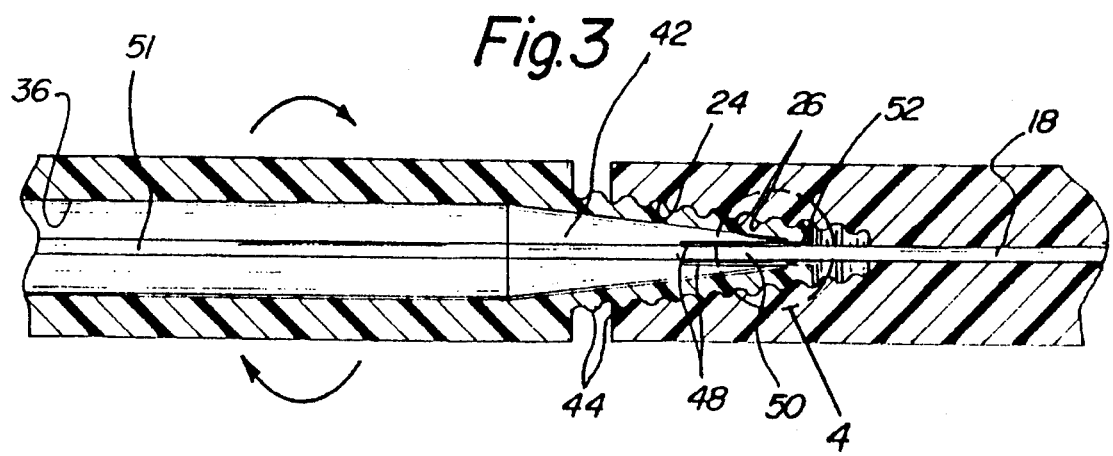
FIG. 3 is an enlarged sectional view of the apparatus of FIG. 1 taken along line 3—3 of FIG. 1.
Figure 4:
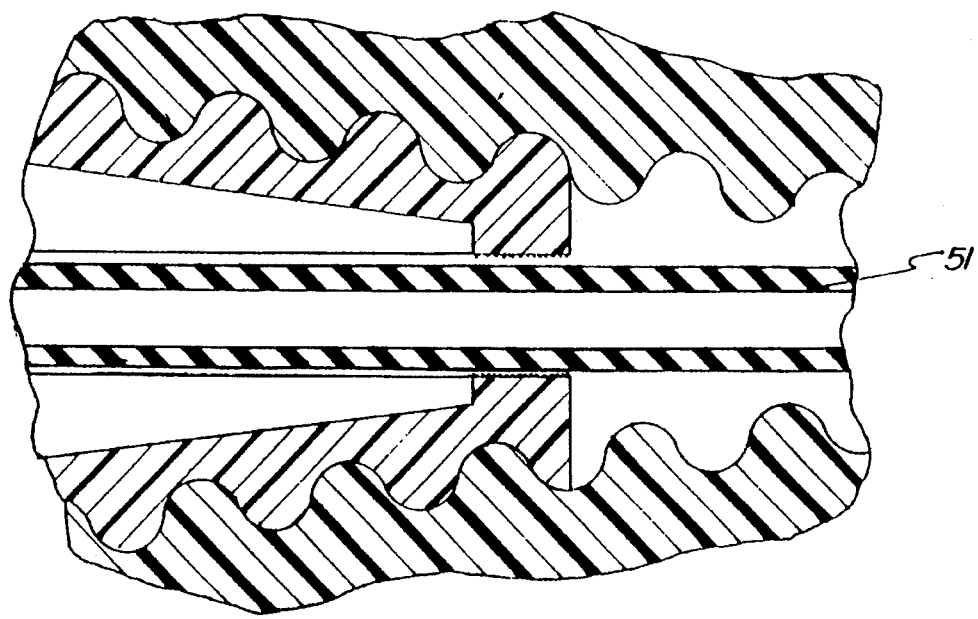
FIG. 4 is an enlarged sectional view of the central extent of the apparatus shown in FIG. 3 taken along the circled line designated as numeral 4.
Figure 5:
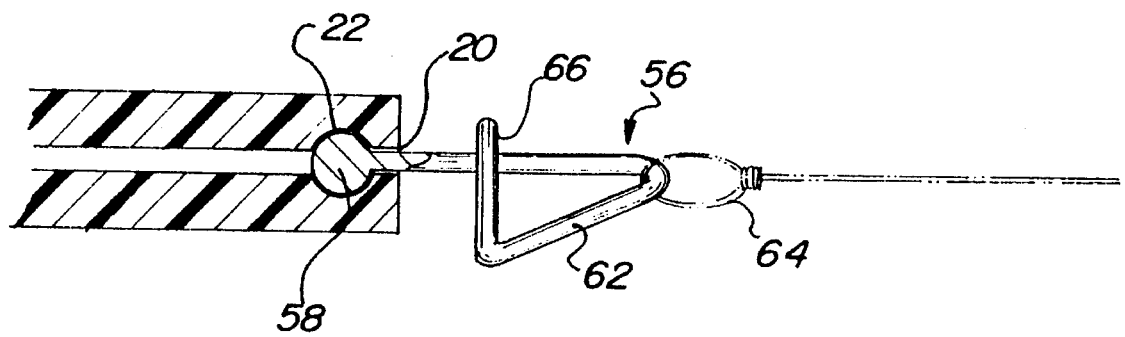
FIG. 5 is a sectional view of the apparatus taken along line 5—5 of FIG. 1.

With reference now to the drawings, and in particular to FIG. 1 thereof, a new and improved no-tie system for coupling fishing lines embodying the principles and concepts of the present invention and generally designated by the reference numeral 10 will be described.

More specifically, it will note noted that the system of the present invention is for coupling a fishing line with a bait and hook assembly. It functions without the threading and tieing of lines and comprises in its simplest of terms, two threadable members cooperable with each other.

The first or outboard member 12 is in a cylindrical configuration. It has an inboard end 14 and an outboard end 16. An axial bore 18 extends therethrough. The outboard end has a central hole 20 along the axis of the first member. It also includes an enlarged space 22 inboardly thereof. The inboard end of the first member is formed with a recess 24 and internal threads 26 symmetrically formed with respect to the axis. The threads are in a cone-shaped configuration with the largest diameter adjacent to the inboard end of the first member and the smallest diameter outboardly of the inboard end.

The second member 30, or inboard member, is in a cylindrical configuration. It has an outboard end 32 and an inboard end 34. An axial bore 36 extends therethrough for the passage of the free end of a fishing line 38. The external diameter of the second member is essentially the same as that of the first member. The outboard end 32 is formed with a cone-shaped projection 42. The largest diameter of the projection is adjacent to the outboard end. The smallest diameter is outboardly thereof.

The cone-shaped projection 42 has external threads 44 matable with the internal threads 26 of the first member. Axle slits 48 are formed in the cone-shaped projection 42.

Such slits allow the segments 50 between the slits 48 to move radially inwardly upon the screwing of the second member into the first member. Radially extending teeth 52 project radially inwardly at the outboard end of the cone-shaped member to grasp a fishing line extending therethrough.

An internal component or rubber tubing 51 is permanently attached to the far ends of the connector and extends to the full length of the connector. Once the fishing line has been inserted or threaded through the tube, the external mechanism is twisted three full turns in an oppositional manner. The effect of this movement initially causes the rubber tubing to twist around and entwine the fishing line. The screwing action of the cone-shaped inboard and outboard components further affects the holding capacity on the line by applying pressure in a clamping, twisting movement, thereby securing the line and preventing slippage.

Next provided is a resilient wire 56. Such wire extends through the hole 20 at the outboard end of the first member. The 22 for swiveling with the wire. The wire 56 has a central extent formed in a loop 62 for receiving the end 64 of a bait and hook assembly 66. The outboard free end of the wire formed into a bend 66 coupling and uncoupling of the portion of the wire adjacent to the outboard end of the first member. This allows the locking and release of the loop of the bait and hook assembly.

Figure 6:
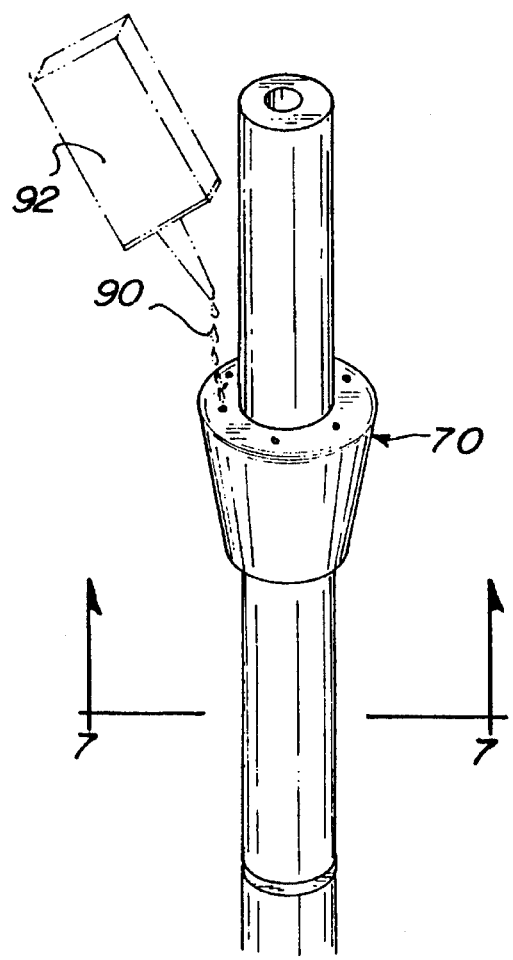
FIG. 6 is a perspective view of a portion of the apparatus shown in FIG. 1 but constructed in accordance with an alternative embodiment of the invention.
Figure 7:
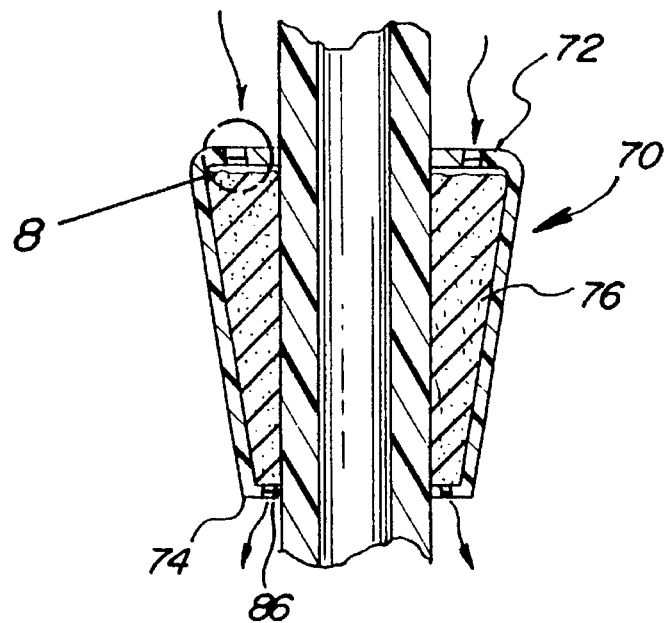
FIG. 7 is a sectional view taken along line 7—7 of FIG. 6.
Figure 8:
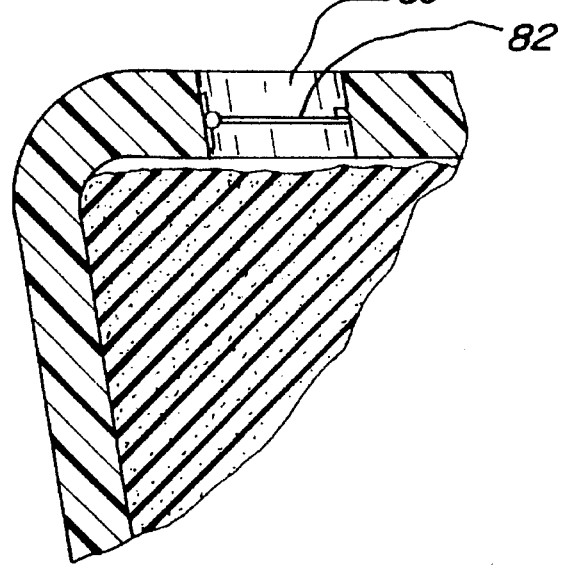
FIG. 8 is an enlarged sectional view of a portion of the components as shown in FIG. 7 taken at the circle designated as numeral 8.
Figure 9:
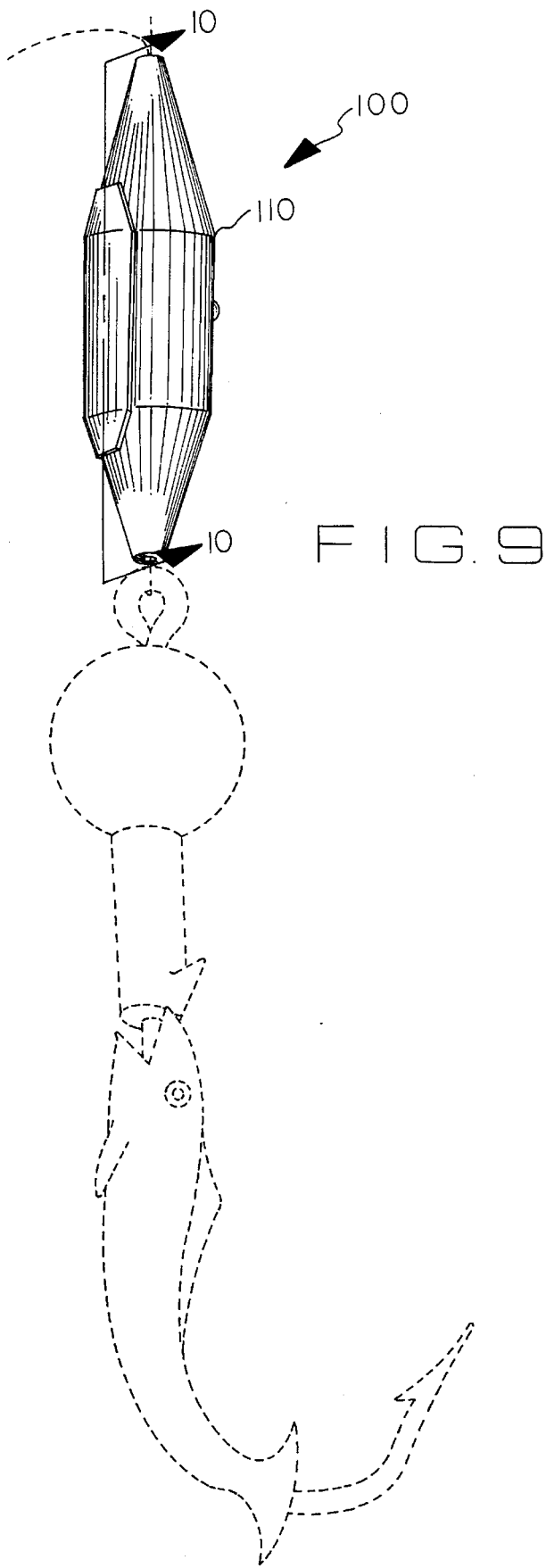
FIG. 9 is a perspective view of an alternate embodiment of the invention.
Figure 10:
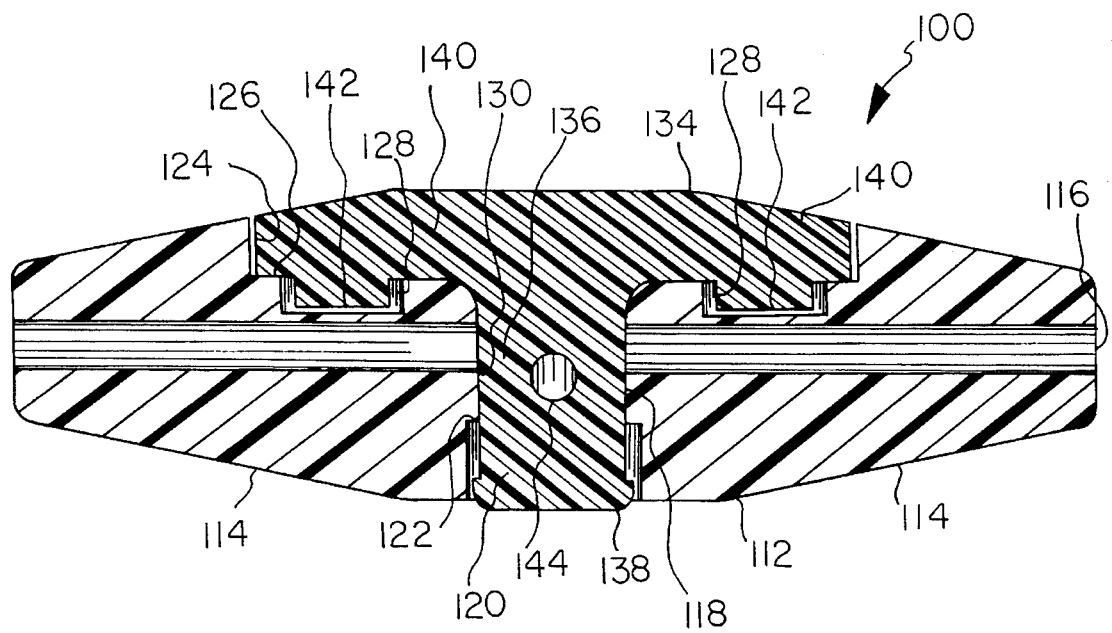
FIG. 10 is a cross sectional view taken along line 10—10 of FIG. 9.

An alternate embodiment of the invention is shown in FIGS. 6, 7 and 8. The alternate embodiment further includes a collar 70 received around one of the members. The collar 70 has a radially extending inboard face 72 and a radially extending outboard face 74. A sponge-like material 76 is located therebetween. Holes 80 and a one way flapper valve 82 are secured over the holes on the inboard face. Holes 86 are also formed in the outboard face. In this manner fish oil 90 from container 92 will saturate the sponge type material 76 and allow its dissemination from the holes 86 of the outboard face.

A second embodiment for the invention is shown in FIGS. 9 through 14. Such Figures depict system 100 for coupling a flexible line 102 having a free end 104 with another member 106 such as a hook or the like without the threading and tying of line.

The major component of the system 100 of the present invention is a body 110. The body has a cylindrical central section 112. On opposite sides of the central section are a pair of similarly shaped, generally cone shaped end sections 114. The body has an elongated primary hole 116. Such primary hole extends axially along the length of the body. In addition, the body is formed with a secondary hole 118. The secondary hole extends radially through the center of the body. The secondary hole has on the first side thereof a cylindrical recess 120. The cylindrical recess has a diameter greater than the diameter of the secondary hole. As a result, an abutting shoulder 122 is formed. The secondary hole also has on the side thereof opposite from the first side a rectangular recess 124. The rectangular recess if formed with a flat bottom 126. In addition, spaced indentations 128 are formed on opposite sides of the secondary hole. Such indentations extend inwardly which is axially with respect to the secondary hole and radially with respect to the primary hole. The region of the secondary hole between the abutment surface and the bottom thus constitutes a bearing surface 130 for a purpose as will be later described.

The next major component of the system 100 is a shaft 134. The shaft has a central cylindrical section 136. Such cylindrical section is formed with an enlarged cylindrical head 138. Such cylindrical section has a diameter slightly less than the diameter of the bearing surface of the body. The cylindrical section also has an axial length slightly greater than the axial length of the bearing surface. The head has a diameter slightly less than the diameter of the cylindrical recess and it has an axial length slightly less than the axial length of the cylindrical recess.

In addition, the shaft is also provided with a pair of shoulders 140. One shoulder is located on each side of the central cylindrical section on the side thereof remote from the head. The shoulders are adapted to fit within the rectangular recess when in the locked position for operation and use. The shoulders are formed with a plurality of projections 142. The projections are positionable within the indentations when in a locked position. The central section of the shaft is also provided with a third or tertiary hole 144. Such tertiary hole is adapted to axially align with the primary hole of the body when in the lock position during operation and use. It should be understood, that any number of projections and indentations may be utilized so long as they are complementary in shape. In the disclosed embodiment, the projections and indentations are rectangular but could readily be made circular, oval or the like and be provided in any number.

Figure 11:
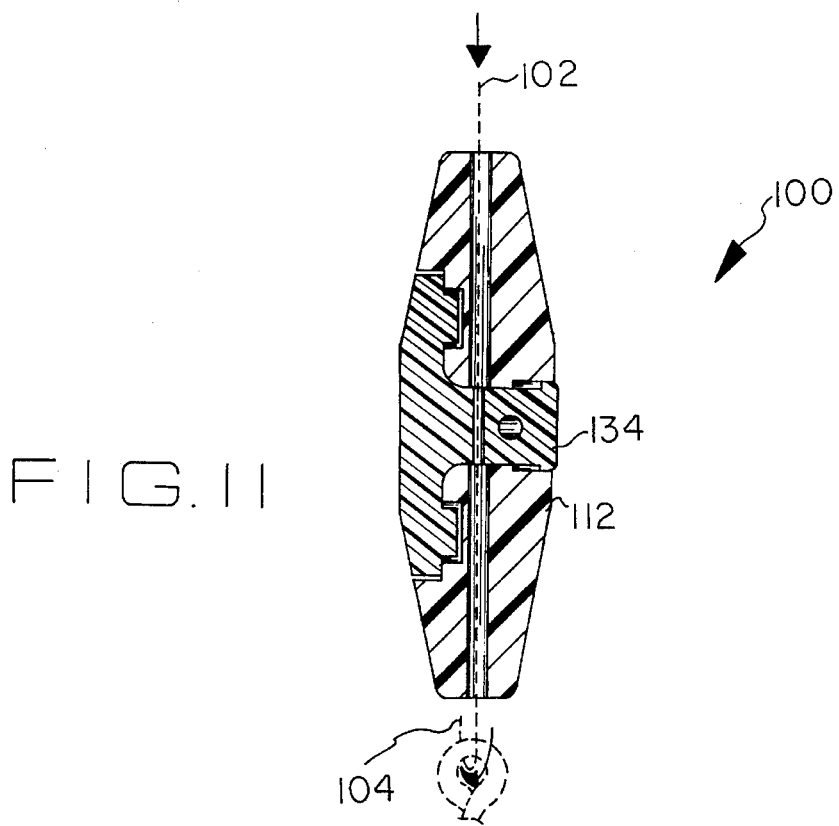

In order to couple the body and shaft and to provide the desired benefits of the present system, the free line of a flexible line is fed through a first, or upper portion, of the primary hole as shown in FIG. 11. The free end is then fed through the aligned tertiary hole of the post and then through the lower, or second, portion of the primary hole. This is effected when the body and post are in the lock position. Thereafter the free end of the line is coupled to an object to be secured such as loop at the end of a hook. Thereafter the free end of the flexible line is fed through the secondary portion, the tertiary portion and the first hole.

After such movement of the free end of the line, the cylindrical section of the post is axially moved to an unlock position as shown in FIG. 12. The head is constrained from excess movement by having its enlarged region contact the abutment surface of the body. In such position, the projections are outside of the indentations. In this manner, the shoulders may be used to rotate the shaft with respect to the body. At this time the shaft is rotated through its shoulders with the central section of the shaft in contact with the bearing surface of the body. This functions to form a coil 148 in the line around the cylindrical section of the post adjacent to the shoulder. Note FIGS. 12 and 14.

After such manipulations of the shaft with respect to the body and movement of the line, the post is then axially inserted into the primary hole to a full extent. This will cause the body and shaft, the entire system, to assume the lock position. In this manner, the projections extend into the indentations to effect the coupling of the post to the body and the securement of a line into a fixed orientation with respect to the system. The objects and advantages of the system may now be effected through the coupling of the flexible line with respect to another member such as a hook without the threading or tying of line.

It should be understood that the present invention could be made of any rigid material adapted to withstand the elements including water, particularly salt water. Any commercially available plastic is preferred so long as it provides the rigidity, durability and has the capability of withstanding deterioration from the elements.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved system for coupling a flexible line having a free end with another member without the tying of line comprising, in combination:

a body having a cylindrical central section and generally cone shaped end sections, the body having an elongated primary hole extending axially along the length thereof and a secondary hole extending radially through the center thereof, the secondary hole having on the first side thereof a cylindrical recess with a diameter greater than the diameter of the secondary hole to form an abutment shoulder, the secondary hole having on the second side thereof opposite from the first side a rectangular recess with a flat bottom and spaced indentations on opposite sides of the secondary hole extending inwardly axially with respect to the secondary hole and radially with respect to the primary hole, the region of the secondary hole between the abutment surface and the bottom constituting a bearing surface;

a post having a central cylindrical section with an enlarged cylindrical head, the cylindrical section having a diameter slightly less than the diameter of the bearing surface and an axial length slightly greater than the axial length of the bearing surface, the head having a diameter slightly less than the diameter of the cylindrical recess and an axial length slightly less than the axial length of the cylindrical recess, the post also having shoulders on the side thereof remote from the head adapted to fit within the rectangular recess, the shoulders having a plurality of projections positionable within the indentations when in a lock position, the cylindrical section of the post also having a radial tertiary hole adapted to axially align with the primary hole of the body when in the lock position; and whereby the free-end of said flexible line may be fed through a first portion of the primary hole and through the tertiary hole of the post and through a second portion of the primary hole when the body and post are in the lock position and then coupled to the member to be secured and then the free end of the flexible line may be fed through the second portion and tertiary hole and first portion, and whereafter the cylindrical section of the post may be axially moved to an unlock position and rotated on the bearing surface to form a coil in the line around the cylindrical section of the post adjacent to the shoulders, and whereafter the cylindrical section may be axially inserted into the primary hole fully to the lock position whereby the projections extend into the indentations to effect the coupling of the post to the body and the securement of the line into a fixed orientation with respect to the system.

2. A new and improved system for coupling a flexible line having a free end with another member without the tying of line comprising:

a body having a cylindrical central section and end sections, the body having an elongated primary hole extending axially along the length thereof and a secondary hole extending radially through the center thereof, the secondary hole having on the first side thereof a cylindrical recess with a diameter greater than the diameter of the secondary hole to form an abutment shoulder, the secondary hole having on the second side thereof opposite-from the first side an enlarged recess with a flat bottom and at least one indentation extending inwardly axially with respect to the secondary hole and radially with respect to the primary hole, the region of the secondary hole between the abutment surface and the bottom constituting a bearing surface.

3. The system as set forth in claim 2 whereby a shaft received by the body has a central cylindrical section with an enlarged cylindrical head.

4. The system as set forth in claim 3 whereby the shaft also has shoulders on a side thereof remote from the head adapted to fit within the enlarged recess, the shoulders having at least one projection positionable within the indentation when in a lock position, the cylindrical section of the shaft also having a radial tertiary hole adapted to axially align with the primary hole of the body when in the lock position.

5. The system as set forth in claim 4 whereby the free end of a flexible line may be fed through a first portion of the primary hole and through the tertiary hole of the shaft and through a second portion of the primary hole when the body and shaft are in the lock position and then coupled to said member to be secured and then the free end of the flexible line may be fed through the second portion and tertiary hole and first portion, and whereafter the cylindrical section of the shaft may be axially moved to an unlock position and rotated on the bearing surface to form a coil in the line around the cylindrical section of the shaft adjacent to the shoulders, and whereafter the cylindrical section may be axially inserted into the primary hole fully to the lock position whereby the at least one projection extends into the at least one indentation to effect the coupling of the shaft to the body and the securement of the line into a fixed orientation with respect to the system.

\* \* \* \* \*